United States Patent
Li et al.

(10) Patent No.: US 8,656,452 B2
(45) Date of Patent: Feb. 18, 2014

(54) DATA ASSURANCE

(75) Inventors: Jun Li, Mountain View, CA (US);
Hamid Reza Motahari Nezhand, Los Altos, CA (US); Bryan Stephenson, Alviso, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 12/840,185

(22) Filed: Jul. 20, 2010

(65) Prior Publication Data
US 2012/0023544 A1    Jan. 26, 2012

(51) Int. Cl.
G06F 17/00 (2006.01)
H04L 29/06 (2006.01)

(52) U.S. Cl.
USPC .............................. 726/1; 713/185

(58) Field of Classification Search
USPC ............................. 705/317; 726/1
See application file for complete search history.

(56) References Cited

U.S. PATENT DOCUMENTS

| | | | | |
|---|---|---|---|---|
| 7,236,909 | B1 * | 6/2007 | Hoyos et al. | 702/182 |
| 7,401,352 | B2 * | 7/2008 | Duri et al. | 726/1 |
| 2006/0004765 | A1 * | 1/2006 | Anderson et al. | 707/10 |
| 2008/0072284 | A1 * | 3/2008 | Horvitz et al. | 726/2 |
| 2008/0082354 | A1 * | 4/2008 | Hurry et al. | 705/1 |

OTHER PUBLICATIONS

Reiner Sailer; Attestation-based Policy Enforcement for Remote Access; Oct. 25-29, 2004, Washington, DC, USA; pp. 308-317.*

* cited by examiner

*Primary Examiner* — Mohammad W Reza
*Assistant Examiner* — Monjour Rahim (57) ABSTRACT

Data assurance capabilities are received that are related to at least one individual persistent object type in a plurality of persistent object types linked to persistent objects stored on the service provider server. In addition, data assurance specifications are received from a customer, the data assurance specifications being based on the data assurance capabilities. Computer-readable data assurance policies for the at least one persistent object type are generated based on the received data assurance specification. The computer-readable data assurance policies then are combined with a corresponding template of data assurance capabilities for the at least one individual persistent object type to generate an enforceable customer-specific data policy.

20 Claims, 7 Drawing Sheets

```
namespace SuperAximServices {
   define control DeleteBy {
      attribute NumberOfRetentionDays: integer;
         constraint NumberOfRetentionDays < 3650;
   }
   define control DeleteAtEndOfEngagement { }
   define capability data-retention-capability {
      exclusive {
            control DeleteBy;
            control DeleteAtEndOfEngagement;
      }
   }
   service CustomerDataMiningService provides {
      attribute service_definition:URL=
            http://www.example.com/DataMiningService?wsdl;

data CustomerPurchaseHistory {
        attribute transientref:URL =
            "http://www.example.com/DataMining.wsdl
                  ?object=CustomerPurchaseHistory";
        attribute persistentref:URL=
            "http://www.example.com/DataMining/
                  schema?data=CustomerPurchaseHistory";
        holds {
            capability data-retention-capability;
            …. //other capability
        }
      }
   }
}
```

FIG. 3a

```
namespace NullCoSelectedServices {
  service SuperAximServices::CustomerDataMiningService required {
      data CustomerPurchaseHistory holds {
         capability data-retention-capability {
            control DeleteBy {
               attribute NumberOfRetentionDays: integer= 30 ; /*days*/
            }
         }
         .... //other capability configuration
      }
      …. //other persistent data associated configuration
   }
}
```

| Generate DataAssurance | Data Analysis Service: Specify data assurance requirements |
|---|---|
| Data types: CustomerProfileInformation CustomerPurchaseHistory ProductInformation FinancialInformation | ◁ Prev   Data type: Customer Profile Information   Next ▷ 420 Configure the data assurance capabilities per your requirements: |

| Capability: | Control Action: | Parameter type: | Parameter value: |
|---|---|---|---|
| ☑ Data Retention | Delete data | on this date ▼ | 2010-05-15 |
| ☑ Data Retention | Notify upon data deletion | to this email: | johndoe@bar.com |
| ☐ Data Migration | Fingerprint data | using this service: | |
| ☐ Data Migration | Verify Safe Harbor certified | | |
| ☐ Data Migration | Notify after migration of data | to this email: | |
| ☐ Data Migration | Propagate controls with data | | |

```
<ServiceCustomerPolicies
  customer = "http://www.nullco.com/MarketingCampaign"
  <CustomerProfileInformation
dataRef=http://www.superacim.com/DataMining/service.wsdl
?object=CustomerProfileInformation">
    <DataAssurancePolicies>
      <DataRetention>
        <DeletedBy>
          <Date format="YEAR-MON-DAY">
            2010-05-15
          </Date>
        </DeletedBy>
        <EmailNotification>
          johndoe@bar.com
```

DATA ASSURANCE

BACKGROUND

Large numbers of consumers, businesses, and public entities are now using the Internet for a variety of transactions. Service providers can offer outsourcing capabilities to business customers using software-as-a-service delivery models in service marketplaces. However, challenges remain in widespread acceptance of such delivery models because customers share business critical or sensitive information and data with the service providers.

Many contracting service providers may further subcontract with subcontracting service providers on behalf of a business. Information assurance becomes more complicated in sub-contracting cases because the contracting service provider requests the subcontracting service provider to follow the agreement, which may be after the subcontracting service provider has received customer data from the service provider.

DETAILED DESCRIPTION

Reference will now be made to the implementations illustrated, and specific language will be used herein to describe the same. It will nevertheless be understood that no limitation of the scope of the technology is thereby intended. Additional features and advantages of the technology may be apparent from the detailed description which follows, taken in conjunction with the accompanying drawings, which together illustrate, by way of example, features of the technology.

As used herein "information assurance" refers to the practice of managing risks related to the use, processing, storage, and transmission of digital information or data and the systems and methods used for those purposes. Information assurance can also refer to the protection of information systems against unauthorized access to information or modification of information, whether in storage, processing or transit, and protection against the denial of service to authorized users, including those measures necessary to detect, document, and counter such threats. "Information assurance" may also be referred to herein as "data assurance".

Enforcement of data assurance controls can include a mechanism to guarantee compliance with corporate policies and government regulations. Doubt that such data assurance controls can be enforced by a service provider handling corporate data as part of an outsourced business process can reduce the confidence of the service customers and thus the potential market for the service. This lowered confidence can be a barrier to the adoption of cloud computing services today.

Disclosed herein are techniques that allow a service provider to specify a broad range of data assurance capabilities which can be used to protect data stored by the service provider on behalf of customers. Customers can select a specific set of data assurance capabilities desired for each type of data sent to the service and parameterize those capabilities to address specific desired standards. The parameterized capabilities chosen by the customer can be called data assurance policies. A framework is also described for the service provider to enforce the customized data assurance policies using a scalable policy enforcement engine.

In one example, a system is described for managing data. The system can include a service provider server to store persistent objects for a customer. An assurance server can include software which can receive data assurance capabilities related to one or more individual persistent object types from a plurality of persistent object types and linked to persistent objects stored on the service provider server. A data assurance capability management module can be on (or otherwise accessible to) the service provider server and can maintain enforceable policy templates of data assurance capabilities for the plurality of persistent object types. The enforceable policy templates of data assurance capabilities can define the machine enforceable policies that can be carried out by the policy enforcement engine and such enforceable policies can be configured based on the customer-specific data assurance policies received by the service provider. A customer data assurance specification module may be stored on (or otherwise accessible to) the assurance server and can generate computer-readable data assurance policies for the one or more persistent object types based on the received data assurance specifications from the customer. A policy translator can reside on (or otherwise be accessible to) the service provider server and can combine the computer-readable data assurance policies with a corresponding enforceable policy template to generate an enforceable customer-specific data policy.

Figure 1A:
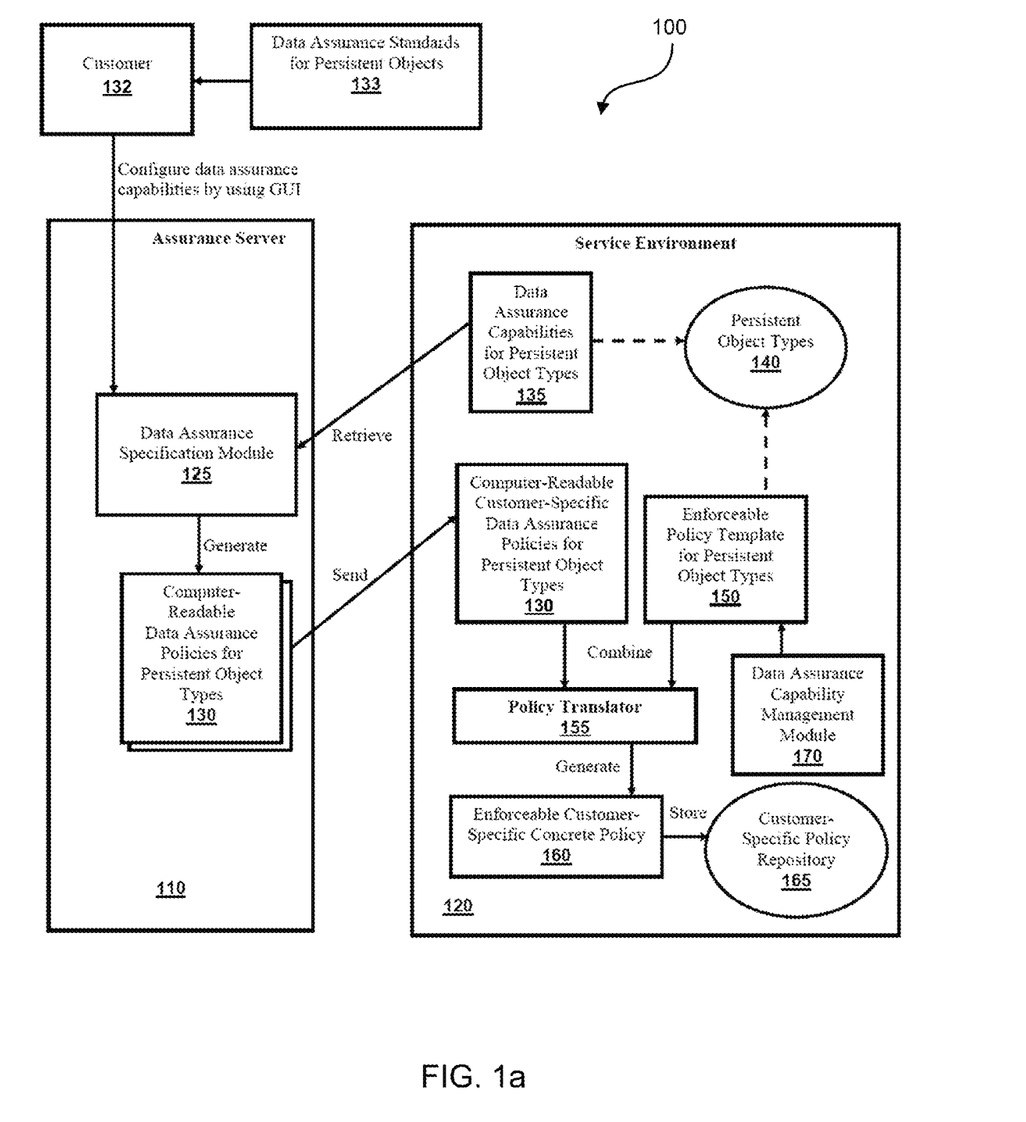
FIGS. 1a-1b are block diagrams of a system for data assurance in accordance with one example.
Figure 1B:
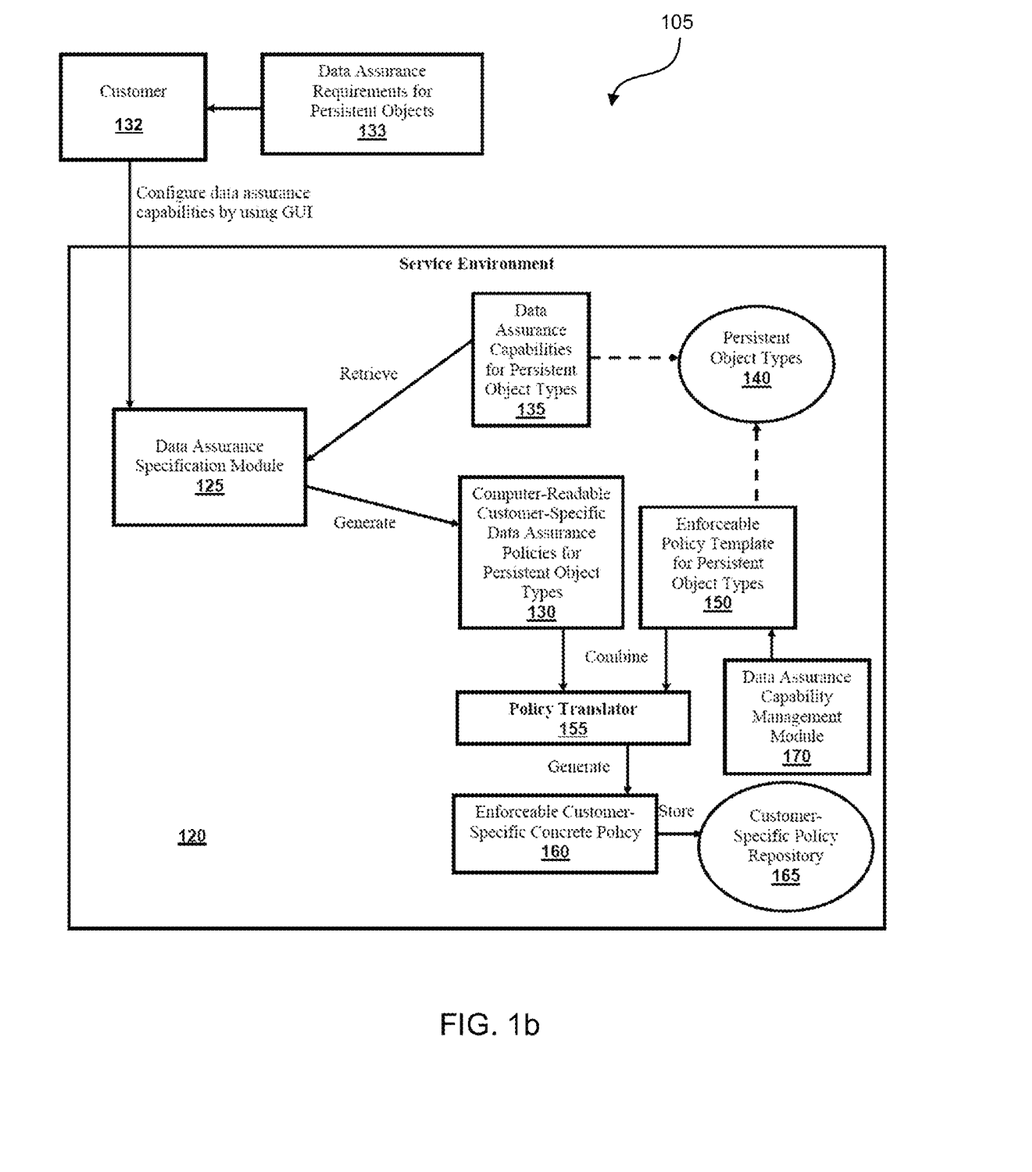

Referring to FIGS. 1a-1b, systems 100, 105 for data assurance are shown in accordance with one example. FIG. 1b is an alternate implementation of a data assurance framework as shown in FIG. 1a, which enables expression and configuration of data assurance enforcement standards for persistent data objects in a service. Reference will be made specifically to FIG. 1a, but FIG. 1b can also be understood in terms of the following description of FIG. 1a. The system 100 can include a service provider server 120 configured to store persistent objects for a customer. As used herein, a "persistent object" is a data object that continues to exist and retains data beyond the duration of the process that creates the data object. Examples of persistent objects include customer names and addresses, order histories, credit card information, etc. The system can allow for different types of persistent objects. For example, customer names may comprise one type of persistent object, credit card information may comprise a different type of persistent object, etc. Identification and categorization of persistent object types 140 can be useful in enabling a customer to specify data assurance policies for specific data object types.

The system 100 of FIG. 1a enables a customer to select and configure the data assurance capabilities offered by a service provider to create a precise set of data assurance policies for the customer's data. The service provider, through the service provider server 120, can define each type of persistent data object 140 in the service environment. For each type of persistent data object, the service provider can define the set of data assurance capabilities 135 the service provider offers for the object type and the acceptable values for configurable parameters of a data assurance capability. A single persistent data object type can have many capabilities associated therewith. A set of capabilities can also vary by object type. For example, the service provider may support encryption of stored credit card numbers but not stored product orders.

Some capabilities may be associated with configurable parameters. For example, a data retention capability may allow the customer to specify a retention time of customer purchase history information. Each data object type can be associated with an enforceable policy template 150 which aids in enforcement and can define the supported information assurance capabilities and the acceptable values for configurable parameters. The template can constrain customer specification of information assurance standards to acceptable values. A data assurance capability management module 170 on the service provider server 120 can be used to create and/or maintain any number of enforceable policy templates of data assurance capabilities for the persistent object types.

The system can include an assurance server 110. The assurance server may comprise a data assurance specification module 125 configured to generate computer-readable data assurance policies for persistent object types. In one example, the persistent object types for which the data assurance specification module can generate data assurance policies can be linked to persistent objects that are stored, or will be stored, on the service provider server. For example, the generated data assurance policies can be based on the persistent object types already being stored by the service provider on behalf of a customer 132 and computer-readable data assurance policies provided by the customer. Alternatively, the generated data assurance policies can be based on an input specification by the customer as to which types of persistent objects will be stored or requested to be stored by the service provider and which data assurance standards are desired for each persistent object type. The customer's data assurance standards 133 for persistent objects can be described in natural-language corporate security policy documents, or government or industry regulations.

Thus, a customer data assurance specification module may enable a customer to specify data assurance policies and standards. The customer data assurance specification module can be configured to generate computer-readable data assurance policies 130 for the one or more persistent object types based on data assurance specifications received from the customer. For example, a customer may access the assurance server via a web browser, or the like, to input the data assurance standards. The data assurance standards input by the customer can be used to generate computer-readable data assurance policies that can be sent to the service provider server.

The data assurance specification module 125 on the assurance server can retrieve a set of data assurance capabilities for one or more specified data object types. The set of data assurance capabilities may comprise enforceable policy controls for the various data object types. The customer can input or specify which capabilities the customer wishes to have enforced for each individual object type. In one example, the specified capabilities are provided before the service provider begins storing data for the customer and the specified capabilities are then applied to the stored data objects once the customer data is stored in the service provider's environment. The customer can configure parameters according to the data assurance capabilities exposed from the service provider by using a graphical user interface, which will be described in more detail below. The customer data assurance specification module can generate computer-readable data assurance policies which follow the customer's selection of data assurance standards for each data object type. The computer-readable data assurance policies can then be sent to the service provider.

A service may receive and store multiple types of persistent data objects for many different customers. Using the example persistent object types, "credit card number" and "order" described above, the customer may wish to have the credit card number deleted within a short time period, but allow the product order information to be retained for a longer period of time. Different customers may configure different sets of standards or policies for the same data object type. The differing configurations can be based on how the customers interpret the sensitivity of the customer data, as well as regulatory and corporate polices which the customers desire to follow.

The system can include a policy translator 155 in the service provider's environment on the service provider server 120. The policy translator can be configured to combine the computer-readable data assurance policies 130 with a corresponding enforceable policy template 150 to generate an enforceable customer-specific concrete data policy 160. In other words, the policy translator can receive two inputs: the customer-specific data assurance policies and the enforceable policy templates upon which the customer-specific data assurance policies are based. The policy translator can generate concrete, customer-specific data assurance enforceable policies for data object types based on the combination of the templates and the data assurance policies. In one example, the enforceable policy templates can be parameterized workflows that instruct a workflow engine on how to track and enforce the customer-defined controls (i.e., actions) on data object instances. The concrete, customer-specific enforceable policies can be the configured workflows, each of which is bound with a set of associated customer-specific parameters. For example, a concrete data retention policy can cause credit card information to be deleted after a date specified by the customer. Such customer-specific parameters can be passed into the workflows at the time the workflows are started. The customer-specific policies can be stored in a customer-specific data assurance policy repository 165.

FIG. 1*b* shows a system 105 similar in many regards to the system in FIG. 1*a*. The system of FIG. 1*b* is implemented in a service environment 120, on which a data assurance specification module 125 resides to receive data assurance specifications from a customer. The system of FIG. 1*b* can include a consolidation of the assurance server from FIG. 1*a* into the service environment.

Figure 2:
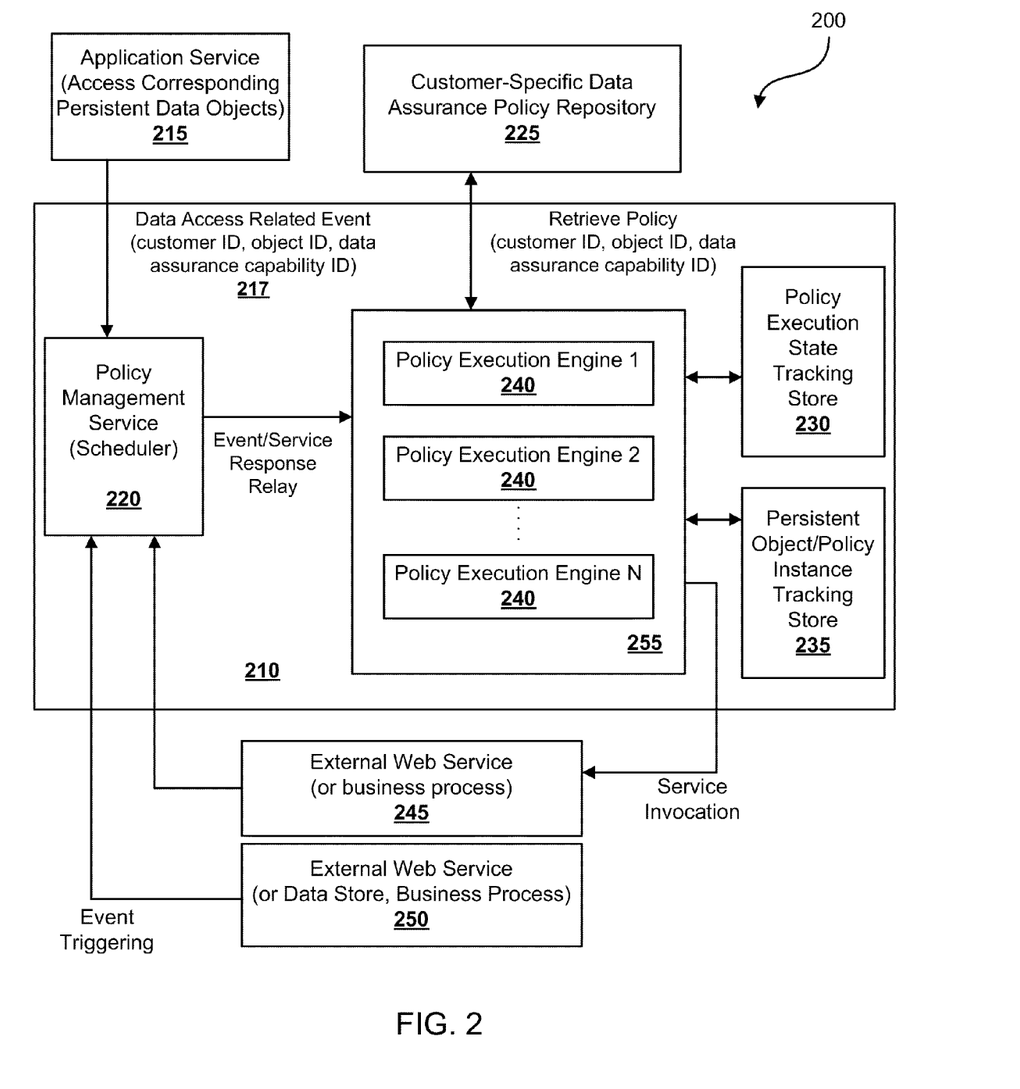
FIG. 2 is a block diagram of a data assurance framework in accordance with one example.

The systems described above can enable scalable policy enforcement. FIG. 2 shows a scalable architecture 200 for data assurance policy enforcement in a service environment. Enforceable customer-specific data assurance policies can be stored in the customer-specific data assurance policy repository 225. The application service 215 is the service offered by the service provider. Within the service, each service method can have service interception points (such as at the beginning of the service invocation, or at the end of the service invocation). The service interception points can serve as event adapters that generate data access related events 217 for the involved persistent data objects. The event's semantics can be defined based on the corresponding policy designed for the persistent data object(s) involved in the service method call. Examples of the events include object created, object updated, object deleted, object migrated, etc. Each event can have an event payload which specifies who makes the client request (represented by a customer ID), which persistent object is involved (represented by an object ID), and which data assurance policy (such as data retention) the event is associated with (represented by a data assurance capability ID).

The data management framework 210 can include any number of policy execution engines 240 for executing the enforceable customer-specific data assurance policies. A policy management service 220 can receive the data access related events. An engine scheduler within the policy management service can determine which policy execution engine will be used to handle an event. The result of this decision can be relayed to a particular active policy execution engine 240 in a machine cluster 255 within the data management framework. The engine scheduler can be implemented using a hash function to map the policy execution instance into a sequence ID which determines a particular active policy execution engine to use.

Based on an input event and the associated customer ID, object ID, and/or data assurance capability ID, the selected policy execution engine 240 can retrieve a corresponding concrete enforceable customer-specific data assurance policy from the customer-specific data assurance policy repository 225. The selected policy execution engine can then perform the execution of the policy to form a policy execution instance. A policy can be executed by raising the corresponding received event to the policy execution instance. During the policy execution an external web service or business process(es) may be involved by having the policy execution instance make a corresponding web service invocation. Response results from such external web service or business process can then be forwarded to the policy management service, which can then further route the response results to the correct policy execution instance in an appropriate policy execution engine.

A policy execution state tracking store 230 can store the execution states after the policy execution instance finishes processing of the event and becomes idle. Similarly, when a new event arrives, the corresponding policy execution instance can be reconstructed from the execution state that is retrieved from the policy execution state tracking store. A persistent object/policy instance tracking store can be used to keep track of the relationship between the persistent object instance and an activated policy execution instance. The persistent object/policy instance tracking store 235 can also keep track of a causality relationship between different policy execution instances (such as parent/child relationships for some complex policies). The persistent object/policy instance tracking store can further track the causality relationship between the policy execution instances and service invocations to the external web service or business process 245, so that the service response results will be returned to the correct policy execution instance.

In addition to being raised from the application service 215, the data access related event 217 can also be raised from an external web service 250 that encapsulates the data store or business process. For example, in data migration a data receiver (such as a sub-contractor) can notify the data sender (the service provider) that the data has been deleted at the end of the service contract between the data receiver and the data sender.

To illustrate how the different modules shown in FIG. 2 may work together to achieve policy enforcement, an example of a data retention policy associated with a customer purchase history information will be described. The application service can deal with customer purchase history information management, which can allow the customer to upload or import the customer purchase history into the service. In this example there may be two events involved in two different service methods. In one of the service methods, a data creation event of the customer purchase history object is triggered. This event can be forwarded to the policy management service 220 and then be routed to a particular active execution engine in the machine cluster 255. Based on the customer ID and the data assurance capability ID that corresponds to the data assurance capability of data retention, the policy execution engine can then create and start a policy execution instance of the customer-specific data retention policy, and then populate the persistent object/policy instance tracking store, to tie the created object instance with the activated policy execution instance. The activated policy execution instance can then be persisted into the policy execution state tracking store.

In the second service method, a data import event can be triggered to handle the actual placement of the customer purchase history object into the persistent store. The event can be forwarded to the policy management service and then relayed to one of the policy execution engines. The policy execution engine can reconstruct the in-memory policy execution instance based on a persistent state of the policy execution instance. With the data import event a data destroy timer (managed by the persistent store) can be set to a future time specified by the data retention policy. When the data destroy timer expires, the policy execution instance can be reactivated again by a policy execution engine, and a data expired event can be raised to the policy execution instance. The data object can then be deleted from the persistent data object store. At the end of this action, a state of the policy execution instance can reach a final or completion state to complete the enforcement of the data retention policy.

The policy management service 220 can serve as an interface for the various policy execution engines. To achieve scalability in a machine cluster, a policy execution engine can run on one of the machines within the cluster and be registered to the policy management service. The policy management service can receive messages from service interception points or external web services/business processes, and deposit the messages in a message queue that belongs to one of the active execution engines, based on the decision of the scheduler in the policy management service. Correspondingly, the selected execution engine can pull the message from the message queue. A message dispatcher on the execution engine can translate the message into a local event in the policy execution runtime module or executable. The event can then be raised to the targeted policy execution instance. Once the event is finished processing, the policy execution instance can be de-hydrated into the policy execution state tracking store. When a subsequent event arrives, the persistent object/policy instance tracking store can determine which policy execution instance should handle this event. The relevant policy execution instance can be hydrated back into the runtime memory. The event can then be forwarded to the policy execution instance. In this scalable policy enforcement framework example, because of the implementation of the policy execution state tracking store, multiple policy execution engines from different machines can be scheduled to handle multiple different event triggers during the lifetime of the policy execution instance.

The scalable policy enforcement engine shown in FIG. 2 can support a large collection of policy execution engines activated in a machine cluster to handle simultaneous enforcement of a large number of active policy instances, which can in turn be due to a large number of concurrent event triggers associated with a large number of persistent objects.

Figure 3A:
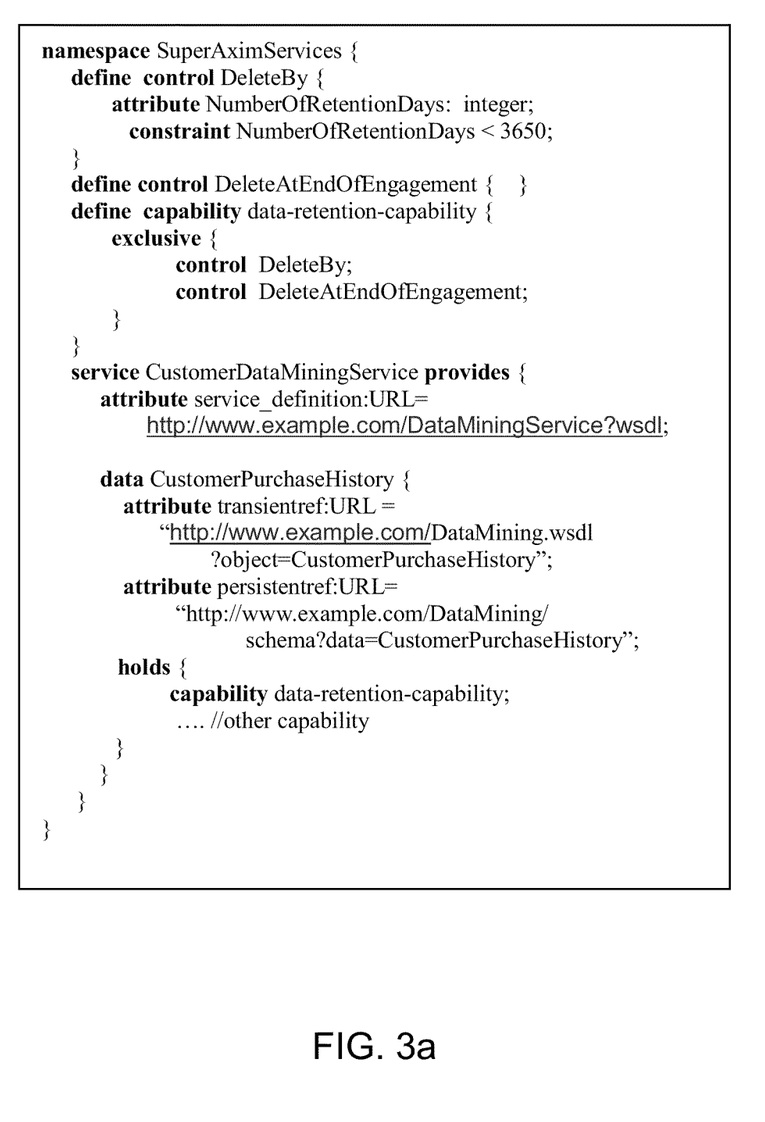
FIGS. 3a-3b are diagrams of service information assurance capabilities and configurations in accordance with one example.

Referring to FIG. 3a, an example of data assurance capabilities for persistent data object types for a data mining service is shown. In particular, FIG. 3a expresses a data-retention-capability for service CustomerDataMiningService. The entire specification is under the namespace of SuperAximServices, which represents all the services that are provided by the service provider called SuperAxim. Two policy control actions are defined for this capability, including DeleteBy and DeleteAtEndOfEngagement. These two policy control actions can be mutually exclusive because the service customer can only choose one control action to configure the data assurance capability. The control DeleteBy has a configurable attribute called NumberOfRetentionDays. This DeleteBy control can be associated with a particular service called CustomerDataMiningService that is provided by the service provider. The DeleteBy control may include a service level attribute called service_definition which specifies the URL from which the public service specification defined in WSDL can be found. The service in this example supports a persistent data type called CustomerPurchaseHistory. The CustomerPurchaseHistory persistent data type has a transient data reference and persistent data reference specified. A transient data reference specifies the location of the public data definition within the WSDL that is identified by the service_definition attribute. The public data definition is designed for the service customer. The persistent data reference can specify the location of a private data definition for the persistent data within the service provider's environment. The private data definition is designed for the service provider's internal service development. The CustomerPurchaseHistory persistent data type supports the data-retention-capability.

Figure 3B:
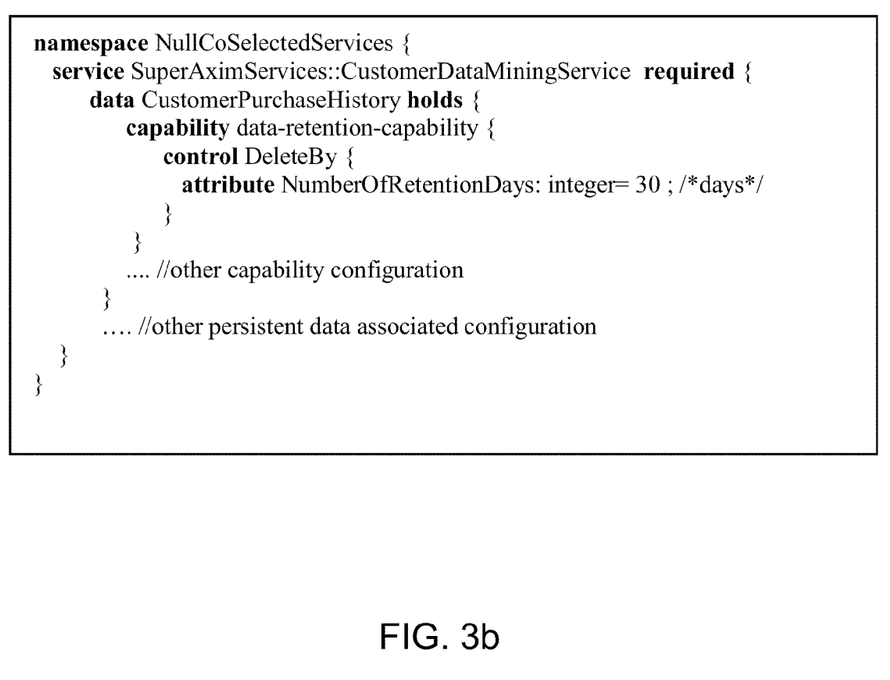

Correspondingly, FIG. 3b shows an example of a data assurance policy configured by a service customer, the data assurance policy being based on a service capability specification such as that presented in FIG. 3a. The data assurance policy is defined under the namespace of NullCoSelectedServices, representing the services that are selected by the service customer called NullCo. The data assurance policy is the result of configuration of the capabilities defined for service CustomerDataMiningService. The persistent data type involved in this service is CustomerPurchaseHistory, which holds the capability data-retention-capability. The example configuration includes the control action DeleteBy, with an attribute NumberofRetentionDays being assigned the value of '30' days.

Selection and configuration of data assurance policies will now be described with reference to FIG. 4. A customer can configure parameters according to the received data assurance capability specification from the service provider using a graphical user interface (GUI) 400. Data assurance capabilities offered by the service, as exemplified in FIG. 3a, can be transformed into a human-understandable format to display to the customer via the GUI. The customer can use a GUI console to input data assurance specifications into the customer data assurance specification module. The customer can use the GUI to browse the capabilities offered for each data object type. In one example, each capability can be presented in a row of a table, along with an associated description and configurable parameters, if any. The table can include checkboxes or other selection means to enable the customer to select a customized set of offered capabilities. Capabilities may include variable user interface (UI) elements which enable the customer to configure the parameters for any selected capabilities. For example, a data retention capability shown in FIG. 4 includes an option box which enables the user to select the options "on this date" or "this many days after last modification". The selection shown in the figure is "on this date" and the parameter value shown is the specific date May 15, 2010.

Figure 4:
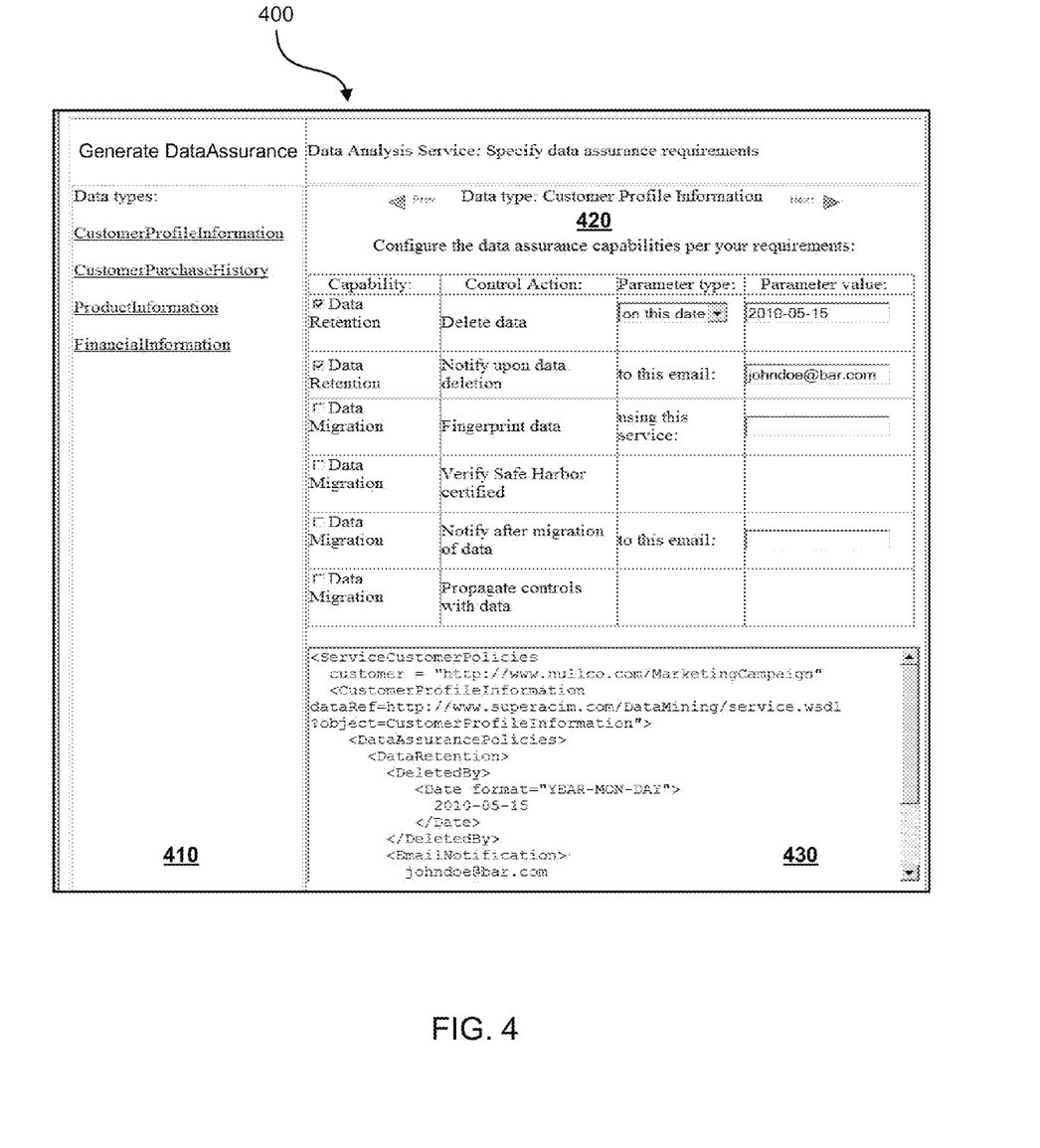
FIG. 4 is a graphical user interface for a service client to configure information assurance capabilities in accordance with one example.

The GUI shown in FIG. 4 can list data object types in an object type column 410 to the left of where data assurance capabilities can be configured. A selected data object type can be displayed at the top of a configuration window, along with navigation controls for navigating among the data object types listed in the data object type column. Each of the data object types listed in the data object type column can also comprise a direct link to a configuration window 420 associated with a respective data object type. The configuration window can display controls for the various capabilities offered, along with configuration options for each capability. For example, FIG. 4 displays data retention and data migration capabilities. The service provider can enable configuration of various policy control actions associated with the different capabilities. For example, control actions for data retention may include data deletion, notification of an individual upon data deletion, etc. Control actions for data migration can include fingerprint data, verification of Safe Harbor certification, notification after migration of data, propagation of controls with data, and so forth. Parameter types can be associated with the control actions. The parameter types can provide further definition to parameter values. The parameter types may comprise fixed values set by the service provider or may comprise variable values configurable by a customer. A parameter value can be associated with a parameter type defined within a control action. For example, with the parameter type "to this email", a parameter value can include an email address of a person to receive a notification. With the parameter type "using this service", the parameter value can specify which service to use to perform the control action.

The policy control actions, parameter types, parameter values, etc. shown in FIG. 4 are for example purposes, and any other of a variety of other capabilities, actions, types, values, etc. may also be used and are considered within the scope of this disclosure. Furthermore, a service provider may provide the configuration controls in a different format, organization, or number of controls from what is shown in the figure. Additional controls not shown in FIG. 4 may also be used and provided by a service provider for configuration by a customer.

The GUI can also include an optional display area 430 for displaying generated computer-readable data assurance policies based on the customer parameter configuration. The computer-readable data assurance policies shown in 430 are represented in an XML format. The service data assurance capabilities shown in FIG. 3 follow a different specification syntax. Both formats are interchangeable and represent the identical underlying data assurance policies. The computer-readable data assurance policies can include the customer-configured parameters in the code. In one example, the computer-readable data assurance policies can be dynamically updated as the parameters in the configuration window are configured. The optional display area can be turned on or off so that a customer sees the computer-readable data assurance policies when desired. Also, according to an example the computer-readable data assurance policies shown in the display area can be directly edited by the customer so that the various policy control actions can be configured without use of the table of controls shown above the display area in FIG. 4.

Methods for managing data in accordance with the description set forth above are also contemplated. Referring to an example method 500 shown in FIG. 5, data assurance capabilities for a plurality of persistent object types are provided

Figure 5:
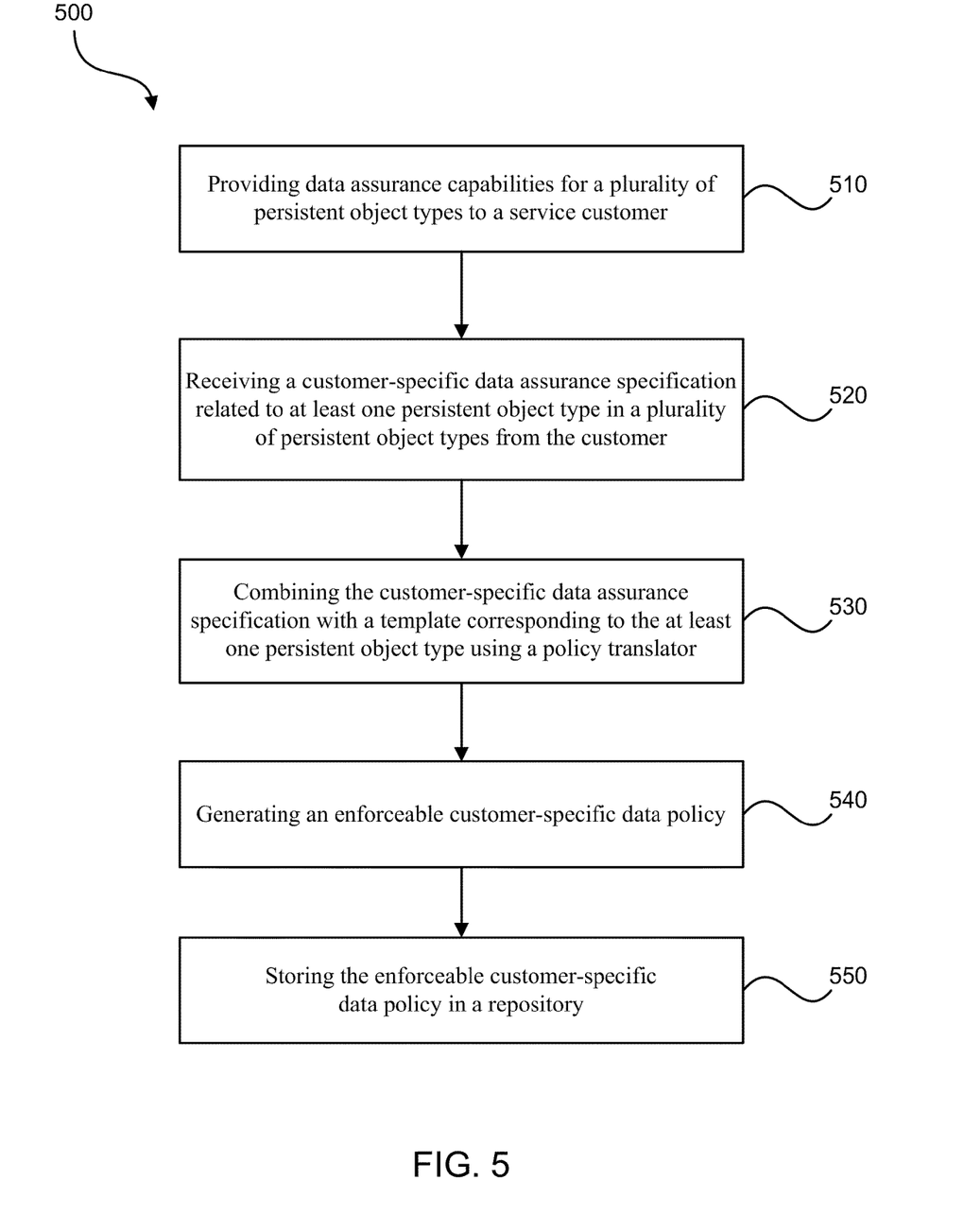
FIG. 5 is a flow diagram of a method for managing data in accordance with one example.

510 to a customer. In one aspect, providing data assurance capabilities for the plurality of persistent object types to the customer further comprises creating a plurality of data assurance capability specifications and storing them on the service provider service. In another aspect, providing data assurance capabilities for the plurality of persistent object types to the customer further comprises transmitting at least one of the data assurance capability specifications to the assurance server for access by the customer.

Customer-specific data assurance policies related to one or more persistent object types in a plurality of persistent object types can be received 520 from the customer. The customer-specific data assurance policies can be transmitted to a service provider. The customer-specific data assurance policies can be combined 530 with an enforceable policy template corresponding to the one or more persistent object types. An enforceable customer-specific data policy can be generated 540 and the enforceable customer-specific data policy can be stored 550 in a repository.

In further implementations, the method can include generating computer-readable data assurance policies for the one or more persistent object types based on the received data assurance specifications, and transmitting the customer-specific data assurance policies to the service provider can comprise transmitting the computer-readable data assurance policies. The method can include generating data access events for accessed persistent objects. The method can also include receiving the generated data access events for persistent objects, interpreting an associated enforceable customer-specific data policy, and enforcing the enforceable customer-specific data policy with regards to persistent objects.

The data management systems and methods described herein may provide various features. For example, the systems and methods can enable expression and communication of data assurance capabilities for individual or specific persistent data object types without applying a blanket assurance policy to all data objects stored by the service provider. A descriptive framework can be provided that allows a service provider to express data assurance capabilities for each persistent data object type managed in the service environment, and to communicate such capabilities to the customer. Data assurance policies can be configured for persistent data objects. Each customer can examine the offered data assurance capabilities and configure the data assurance capabilities using a GUI to create data assurance policies which meet the customer's specific needs. Scalable service-side enforcement of customer-specific data assurance policies may also be provided. Data assurance policies from the customer may be sent to the service provider's environment. Concrete data assurance policies can be established by combining the service-side data assurance enforcement template with the customer-specific policy configuration parameters. A scalable policy enforcement architecture can allow such concrete data assurance policies to be enforced accordingly in a scalable manner, even among sub-contracting service providers, with respect to the number of customers and the number of persistent objects that are being managed.

The methods and systems of certain implementations may be implemented in hardware, software, firmware, or combinations thereof. In one implementation, the method can be executed by software or firmware that is stored in a memory and that is executed by a suitable instruction execution system (e.g., a processor). If implemented in hardware, as in an alternative implementation, the method can be implemented with any suitable technology.

The various engines, tools, or modules discussed herein may be, for example, software, firmware, commands, data files, programs, code, instructions, or the like, and may also include suitable mechanisms.

Other variations and modifications of the above-described implementations are possible in light of the foregoing disclosure. Further, at least some of the components may be implemented by using a programmed general purpose digital computer, by using application specific integrated circuits, programmable logic devices, or field programmable gate arrays, or by using a network of interconnected components and circuits. Connections may be wired, wireless, and the like.

Also within the scope of this disclosure is the implementation of a program or code that can be stored in a machine-readable medium to permit a computer to perform any of the methods described above.

Various functions, names, or other parameters shown in the drawings and discussed in the text have been given particular names for purposes of identification. However, the functions, names, or other parameters are only provided as some possible examples to identify the functions, variables, or other parameters. Other function names, parameter names, etc. may be used to identify the functions, or parameters shown in the drawings and discussed in the text.

While the forgoing examples are illustrative, it will be apparent to those of ordinary skill in the art that numerous modifications in form, usage and details of implementation can be made without the exercise of inventive faculty, and without departing from the principles and concepts of this disclosure. Accordingly, it is not intended that this disclosure be limited, except as by the claims set forth below.

The invention claimed is:

1. A system for data assurance, comprising:
a service provider server configured to store persistent objects for a customer;
a customer data assurance specification module configured to:
receive data assurance capabilities related to at least one individual persistent object type in a plurality of persistent object types linked to persistent objects stored on the service provider server; and
receive data assurance specifications from the customer, the data assurance specifications being based on the data assurance capabilities; and
generate computer-readable data assurance policies for the one or more persistent object types based on the received data assurance specifications; and
a policy translator on the service provider server configured to combine the computer-readable data assurance policies with a corresponding enforceable policy template of data assurance capabilities for the at least one individual persistent object type to generate an enforceable customer-specific policy.

2. A system as in claim 1, further comprising an application service hosted on the service provider server, comprising service interception points configured to generate data access events when an application service accesses persistent data objects.

3. A system as in claim 1, further comprising a policy enforcer configured to receive generated data access events for persistent objects and enforce the enforceable customer-specific policy with regards to persistent objects.

4. A system as in claim 1, further comprising a graphical user interface (GUI) configured to enable customer input of the data assurance specifications into the customer data assurance specification module, wherein the GUI comprises a data assurance capability list, a set of control actions defined for each capability, and parameter values associated with the set of control actions.

5. The system of claim 1, wherein the data assurance capabilities are selected by a user for each type of data sent to the service provider server.

6. The system of claim 1, wherein the data assurance policies are parameterized capabilities chosen by a user.

7. The system of claim 1, wherein the corresponding enforceable policy template of data assurance capabilities define machine enforceable policies carried out by a policy enforcement engine, and wherein the enforceable policies templates are configurable based on customer-specific data assurance policies.

8. The system of claim 1, further comprising a scalable policy enforcement framework, wherein multiple policy execution engines from different machines are scheduled to handle multiple different event triggers during a lifetime of an instance of the enforceable customer-specific policy.

9. The system of claim 1, further comprising a tracking store to keep track of a causality relationship between different policy execution instances of the enforceable customer-specific policy.

10. A method for data assurance, the method stored as computer-readable program code on a non-transitory computer-readable medium and executable by a processor, the method comprising:
    providing data assurance capabilities for a plurality of persistent object types to a service customer;
    receiving a customer-specific data assurance specification related to at least one persistent object type in a plurality of persistent object types from the customer;
    combining the customer-specific data assurance specification with a template corresponding to the at least one persistent object type using a policy translator;
    generating an enforceable customer-specific data policy by a policy translator on a service provider server configured to combine data assurance policies with a corresponding enforceable policy template of the data assurance capabilities for the at least one of the plurality of persistent object types; and
    storing the enforceable customer-specific data policy in a repository.

11. A method as in claim 10, further comprising generating a computer-readable data assurance policy for the at least one persistent object types based on the received customer-specific data assurance specification, wherein transmitting the customer-specific data assurance specification to the service provider server comprises transmitting the computer-readable data assurance policy.

12. A method as in claim 10, wherein providing data assurance capabilities for the plurality of persistent object types to the customer further comprises creating templates describing the data assurance capabilities for the plurality of persistent object types and storing the templates on the service provider server.

13. A method as in claim 10, further comprising:
    generating data access events for accessed persistent objects;
    receiving the generated data access events for the accessed persistent objects;
    interpreting an associated enforceable customer-specific data policy; and
    enforcing the enforceable customer-specific data policy with regards to the accessed persistent objects.

14. A method as in claim 10, further comprising receiving generated data access events for at least one of the plurality of persistent objects and enforcing the enforceable customer-specific data policy with regards to the at least one of the plurality of persistent objects.

15. A system for data assurance, the system including computer-readable program code stored on a non-transitory computer-readable medium and executable by a processor, comprising:
    a data store on a server for storing a plurality of persistent objects;
    an application service comprising service interception points configured to generate data access events for accessed persistent objects;
    a customer policy repository comprising an enforceable customer-specific data policy created from a combination of customer-specific data assurance specification and an enforceable policy template for a persistent object type;
    a policy translator on a service provider server configured to combine the customer specific data assurance specification with a corresponding enforceable policy template of data assurance capabilities for the persistent object type to generate an enforceable customer-specific policy; and
    a policy enforcer configured to receive the generated data access events, and enforce the enforceable customer-specific data policy with regards to the accessed persistent objects.

16. A system as in claim 15, wherein the server comprises the service provider server and the system further comprises a data assurance capability management module on the service provider server for maintaining templates of data assurance enforcement capabilities for the persistent object type.

17. A system as in claim 15, further comprising a customer data assurance specification module configured to generate a computer-readable data assurance policy for the persistent object type based on user input of the customer-specific data assurance specification.

18. A system as in claim 15, further comprising a policy translator on the server configured to combine the customer-specific data assurance specification with a corresponding, template to generate the enforceable customer-specific data policy stored in the customer policy repository.

19. A system as in claim 15, further comprising a policy execution state tracking repository.

20. A system as in claim 15, further comprising a tracking repository to keep track of the relationship between the persistent object instance and an activated policy execution instance.

* * * * *

UNITED STATES PATENT AND TRADEMARK OFFICE
CERTIFICATE OF CORRECTION

| | |
|---|---|
| PATENT NO. | : 8,656,452 B2 |
| APPLICATION NO. | : 12/840185 |
| DATED | : February 18, 2014 |
| INVENTOR(S) | : Jun Li et al. |

It is certified that error appears in the above-identified patent and that said Letters Patent is hereby corrected as shown below:

In the Claims

In column 12, line 50, in Claim 18, delete "corresponding," and insert -- corresponding --, therefor.

Signed and Sealed this
Tenth Day of June, 2014

Michelle K. Lee
*Deputy Director of the United States Patent and Trademark Office*